US011586458B2

(12) United States Patent
Tsirkin et al.

(10) Patent No.: US 11,586,458 B2
(45) Date of Patent: Feb. 21, 2023

(54) FAST DEVICE DISCOVERY FOR VIRTUAL MACHINES

(71) Applicant: RED HAT, INC., Raleigh, NC (US)

(72) Inventors: Michael Tsirkin, Lexington, MA (US); Paolo Bonzini, Milan (IT)

(73) Assignee: Red Hat, Inc., Raleigh, NC (US)

( * ) Notice: Subject to any disclaimer, the term of this patent is extended or adjusted under 35 U.S.C. 154(b) by 340 days.

(21) Appl. No.: 16/801,737

(22) Filed: Feb. 26, 2020

(65) Prior Publication Data
US 2021/0263760 A1 Aug. 26, 2021

(51) Int. Cl.
G06F 9/455 (2018.01)
G06F 12/0882 (2016.01)

(52) U.S. Cl.
CPC ...... *G06F 9/45558* (2013.01); *G06F 12/0882* (2013.01); *G06F 2009/45595* (2013.01)

(58) Field of Classification Search
CPC combination set(s) only.
See application file for complete search history.

(56) References Cited

U.S. PATENT DOCUMENTS

| | | | |
|---|---|---|---|
| 7,480,755 B2 | 1/2009 | Herrell et al. | |
| 7,757,231 B2 | 7/2010 | Anderson et al. | |
| 9,354,896 B1 | 5/2016 | Yang et al. | |
| 9,596,261 B1 * | 3/2017 | Lukacs | H04L 63/145 |
| 10,102,022 B2 | 10/2018 | Tsirkin | |
| 2008/0005297 A1 * | 1/2008 | Kjos | H04L 67/08 709/223 |
| 2009/0037682 A1 * | 2/2009 | Armstrong | G06F 12/1475 718/1 |
| 2009/0276775 A1 * | 11/2009 | Brown | G06F 9/5077 718/100 |
| 2011/0173353 A1 * | 7/2011 | Bauman | G06F 9/45558 710/28 |
| 2014/0181810 A1 * | 6/2014 | Lvovsky | G06F 9/45558 718/1 |
| 2015/0304233 A1 * | 10/2015 | Krishnamurthy | G06F 9/4401 709/226 |
| 2016/0350235 A1 * | 12/2016 | Tsirkin | G06F 9/45558 |
| 2017/0199768 A1 | 7/2017 | Arroyo et al. | |
| 2017/0277632 A1 | 9/2017 | Moriki et al. | |

(Continued)

OTHER PUBLICATIONS

Zhang et al., "Enabling Trusted Data-Intensive Execution in Cloud Computing", 2014, IEEE, pp. 355-363. (Year: 2014).*

(Continued)

*Primary Examiner* — Kenneth Tang
(74) *Attorney, Agent, or Firm* — Lowenstein Sandler LLP

(57) ABSTRACT

A hypervisor identifies a memory address associated with a device slot of a communication bus; determines that the device slot of the communication bus is not associated with any of one or more devices; generates a memory page for the memory address, wherein the memory page comprises a value that indicates that the memory address is not associated with any of the devices; maps, in a page table, a page table entry for the memory page to the memory address, wherein the page table entry indicates that the memory page is read only for a guest operating system (OS) of a virtual machine (VM); and causes the memory page to be provided to the guest OS of the VM in view of a read access of the memory address by the guest OS.

20 Claims, 6 Drawing Sheets

(56) References Cited

U.S. PATENT DOCUMENTS

| | | | |
|---|---|---|---|
| 2017/0337073 A1* | 11/2017 | Tsirkin | G06F 13/102 |
| 2018/0107607 A1* | 4/2018 | Tsirkin | G06F 12/1027 |
| 2018/0239625 A1* | 8/2018 | Tsirkin | G06F 9/4881 |
| 2018/0276024 A1* | 9/2018 | He | G06F 9/45508 |
| 2019/0146803 A1 | 5/2019 | Reed et al. | |
| 2019/0311123 A1* | 10/2019 | Lal | H04L 9/3226 |

OTHER PUBLICATIONS

USPTO, Notice of Allowance for U.S. Appl. No. 16/801,741, dated Dec. 24, 2021.

Clément Dévigne, "Executing Secured Virtual Machines within a Manycore Architecture", Hal Archives, 2016, 16 pages.

NVIDIA Drive 5.0 Foundation SDK, Development Guide 5.0.5.0 Release, 2017, 28 pages.

* cited by examiner

FAST DEVICE DISCOVERY FOR VIRTUAL MACHINES

TECHNICAL FIELD

The present disclosure is generally related to computer systems, and more particularly, to fast device discovery for virtualized computer systems.

BACKGROUND

A virtual machine (VM) is an emulation of a computer system. When executed on appropriate hardware, a VM creates an environment allowing the virtualization of an actual physical computer system (e.g., a server, a mainframe computer, etc.). The actual physical computer system is typically referred to as a "host machine." Typically, a component on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system" or "guest OS." The guest OS and applications executing within the guest OS can be collectively referred to as the "guest."

Physical devices connected to a communication bus, such as Peripheral Component Interconnect (PCI) bus, can be made available to guests by the hypervisor by a process known as device assignment. The hypervisor can create a virtual device within the guest that is associated with the physical device so that any access of the virtual device can be forwarded to the physical device by the hypervisor. In many virtualized systems, a guest can identify hardware devices that are available via a PCI bus but a process referred to as device discovery.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
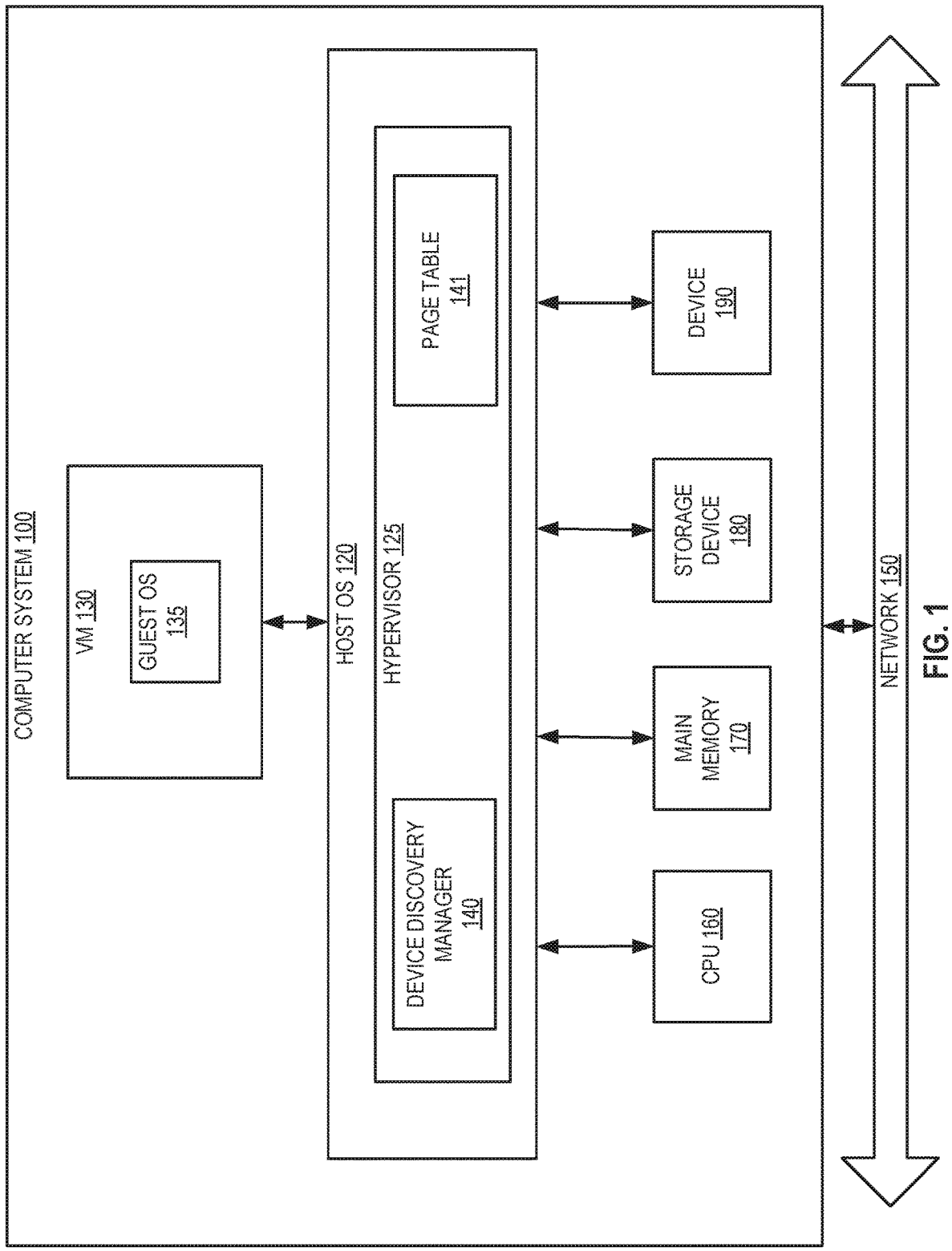
FIG. 1 depicts a high-level component diagram of an example computer system architecture, in accordance with one or more aspects of the present disclosure.

Described herein are methods and systems for fast device discovery in virtualized computer systems. Guests in conventional virtualized environments can spend a large part of their startup time performing PCI device discovery operations. This is typically performed by a guest OS by accessing the possible devices on the PCI bus in order of their associated position, or "slot", on the PCI bus. This process can sometimes be referred to as "probing the slots" of the PCI bus. In many virtualized environments, when a guest probes a PCI slot, it does so by performing a read operation of a special memory location associated with the PCI slot. If the device slot is associated with hardware device, that slot is referred to as "occupied" or "assigned". In such instances, a memory configuration space is allocated on the host that is associated with the device for that PCI slot. If the device slot is not associated with a hardware device, that slot is referred to as "unoccupied" or "unassigned". According to the PCI specification, a read performed on a memory address for an unoccupied/unassigned PCI port receive a returned value to indicate that the device slot is not unoccupied/unassigned. For example, the returned value may be all 1's (hexadecimal 0xff) in each byte. Accordingly, operating systems typically test for that value when determining whether a device slot is occupied or not.

In conventional virtualized environments, the hypervisor manages the device discovery process as an Input/Output (I/O) operation of the associated configuration space of a device. If a PCI device is unoccupied/unassigned, there should not be an associated configuration space (since there is no device at that slot), and therefore should not be an associated entry in the mapping table. In such instances, when a guest OS attempts to access a PCI slot that is unoccupied/unassigned, this causes a read to be performed on the memory address for that slot. Since there should not be a configuration space for that slot, the attempt to read the memory address results in a read of memory that has not been allocated. This can result in a VM exit to the hypervisor (e.g., transitioning control to the hypervisor). The hypervisor may then determine that the guest OS has attempted to access a device slot that is unoccupied/unassigned, and will provide the all 1's value to the guest OS to indicate to the guest OS that the slot is unoccupied/unassigned.

The conventional discovery process, however, can result in significant overhead during the startup of a VM due to VM exits issued resulting from accesses to any unoccupied/unassigned PCI device slots. This issue can be compounded in environments with a large number of unoccupied/unassigned PCI device slots, since the number of consecutive VM exits issued for multiple unoccupied/unassigned PCI device slots is often increased. Moreover, in virtualized environments with a large number of VMs, the performance impact is additionally increased since each guest OS executes the same discovery process. In such cases a single unoccupied/unassigned PCI device slot on a host system can result in a VM exit issued during startup of each VM in the system, which reduces the performance of the entire system as a whole.

Some conventional systems attempt to mitigate these performance issues by disabling PCI to avoid the additional startup overhead. This, however, prevents many virtualized environments from realizing the flexibility and performance improvements of a PCI communication bus for connected hardware.

Aspects of the present disclosure address the above noted and other deficiencies by implementing a device discovery manager to facilitate fast device discovery for virtual machines. The device discovery manager can allow a hypervisor to configure memory mappings for unoccupied/unassigned PCI device slots to allow a guest OS to perform device discovery without causing excessive VM exits. The device discovery manager can create memory mappings to read only memory pages for the memory addresses associated with unoccupied/unassigned PCI device slots. The read only memory pages can be allocated to store the return values (e.g., the all 1's values) that indicate that the PCI device slot is unoccupied/unassigned. Thus, when a guest OS attempts to probe an unoccupied/unassigned PCI device slot, the probe can result in a read operation against the associated memory address for the PCI device slot. Since the read only page has been allocated with a valid page table entry, the values stored in the read only page can be returned to the guest without causing a VM exit. The guest OS receives the all 1's values, and recognizes that that PCI device slot is unoccupied/unassigned without involving any additional overhead.

Aspects of the present disclosure present advantages over conventional solutions to the issues noted above. First, the device discovery manager of the present disclosure can provide significant reductions in resources used by VMs during startup. Since VM exits resulting from accesses to unoccupied/unassigned PCI slots can be significantly reduced, VM efficiency can be significantly improved in terms of processor cycles utilized during startup operations as well as overall elapsed time to complete the startup process for a VM. Additionally, since resource efficiency can be improved in a single VM, overall performance of a host system with many VMs can be dramatically improved.

FIG. 1 is a block diagram of a computer system 100 in which implementations of the disclosure may operate. Although implementations of the disclosure are described in accordance with a certain type of system, this should not be considered as limiting the scope or usefulness of the features of the disclosure.

As shown in FIG. 1, the computer system 100 is connected to a network 150 and comprises one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to CPU 160. The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet). It should be noted that although, for simplicity, a single CPU 160, storage device 180, and device 190 are depicted in FIG. 1, other implementations of computer system 100 may comprise a plurality of CPUs, storage devices, and devices.

Computer system 100 may additionally include a virtual machine (VM) 130. VM 130 may be an application environment that executes programs as though it was an actual physical machine. VM 130 may comprise a guest operating system (OS) 135 that can handle the execution of applications (not pictured) within the VM. It should be noted that although, for simplicity, a single VM 130 is depicted in FIG. 1, computer system 100 may host a plurality of VMs 130.

Computer system 100 may also include a host operating system (OS) 120, which may comprise software, hardware, or both, that manages the hardware resources of the computer system and that provides functions such as inter-process communication, scheduling, virtual memory management, and so forth. In some examples, host operating system 120 also includes a hypervisor 125, which provides a virtual operating platform for virtual machine (VM) 130 and that manages its execution. It should be noted that in some other examples, hypervisor 125 may be external to host OS 120, rather than embedded within host OS 120.

Hypervisor 125 can include device discovery manager 140 for facilitating fast device discovery. In various implementations, device discovery manager 140 can be invoked to configure memory mappings for memory addresses associated with unoccupied/unassigned PCI device slots. In an illustrative example, device discovery manager 140 can identify a memory address associated with a PCI device slot and determine whether that PCI device slot is associated with a hardware device. If device discover manager 140 determines that the PCI device slot is not associated with a hardware device (e.g., the PCI device slot is unoccupied/unassigned), device discovery manager 140 can generate a read only memory page for the memory address associated with the unoccupied/unassigned PCI device slot. As noted above, the device discovery manager can allocate the page and store a value in the memory page that indicates that the PCI device slot for that memory address is not associated with any device (e.g., any device of particular type such as hardware device). For example, the value can be all 1's (0xff) for each byte of the page.

Device discovery manager 140 can then map, in mapping table 141, a page table entry that maps the memory address to the read only memory page, where the page table entry indicates that the memory page is read only for guest OS 135 of VM 130. For example, device discover manager 140 can map an extended page table (EPT) entry for the memory page that maps to the guest physical address (GPA) associated with the unoccupied/unassigned PCI device slot. The EPT entry for the memory page can be used by the CPU to cause the memory page to be provided to guest OS 135 responsive to detecting a read access of the memory address by guest OS 135. Thus, during startup of VM 130, when guest OS 135 probes the unoccupied/unassigned PCI device slot, the CPU accesses the mapping table entry for the GPA of the slot, and identifies the memory page containing the all 1's value. The CPU can then provide the contents of the memory page to guest OS 135 without a VM exit being issued.

In some implementations a separate read only memory page can be created for each unoccupied/unassigned PCI device slot. Alternatively, a single read only memory page can be created and shared for all unoccupied/unassigned PCI device slots for a VM. In other implementations, a single read only memory page can be created and shared for all unoccupied/unassigned PCI device slots across all VMs managed by hypervisor 125.

In some implementations, a series of unoccupied/unassigned PCI device slots may be associated with a range of contiguous memory space associated with guest OS 135. In such instances device discovery manager 140 can allocate a large memory page for the memory address range that includes the series of unoccupied/unassigned PCI device slots. Device discovery manager 140 can then create a single mapping table entry that maps the range of guest physical memory addresses that includes the series of unoccupied/unassigned PCI device slots to the large memory page.

Device discovery manager 140 is described in further detail below with respect to FIGS. 2-3.

Figure 2:
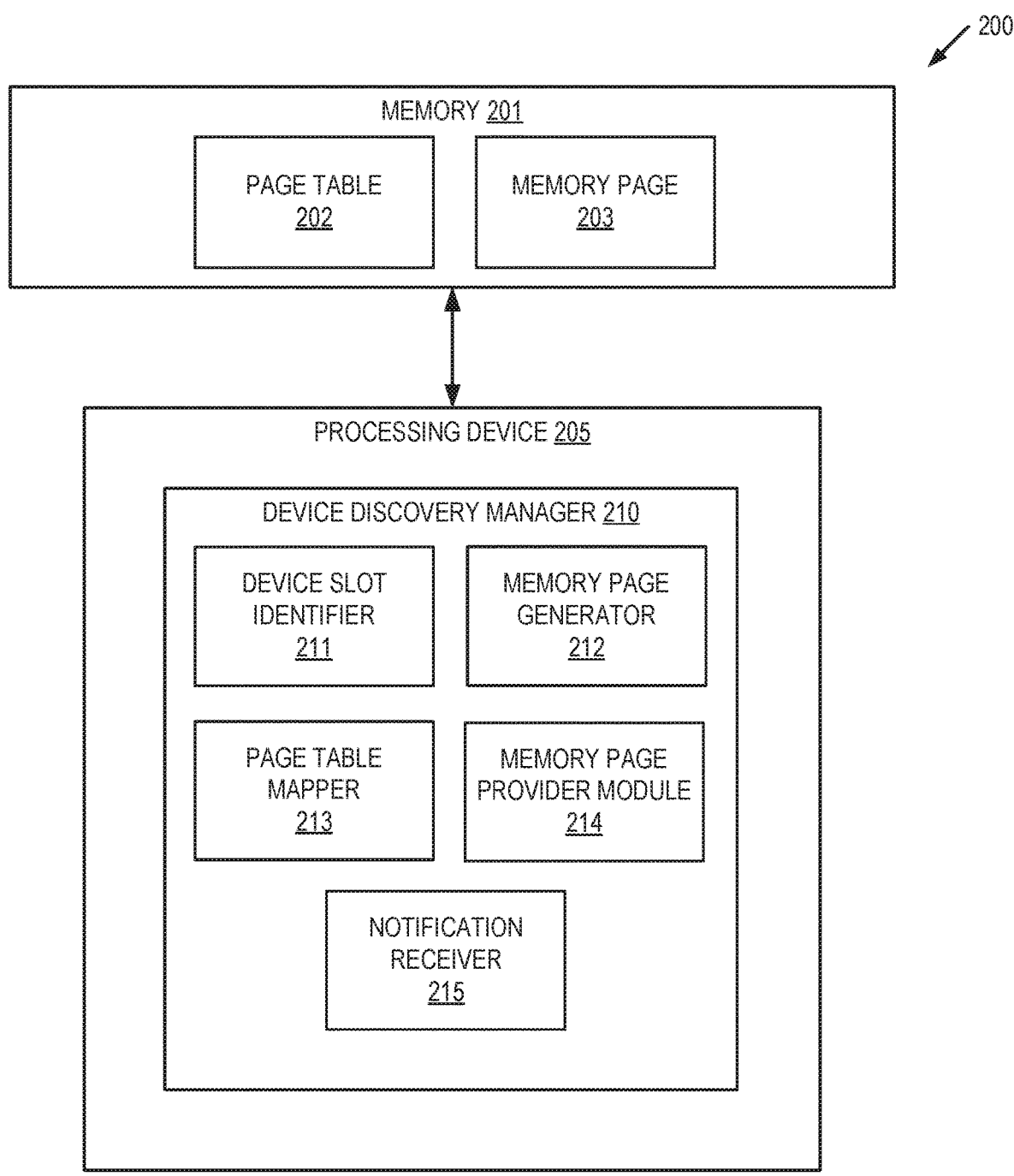
FIG. 2 depicts a block diagram illustrating an example of a device discovery manager to facilitate fast device discovery for virtual machines, in accordance with one or more aspects of the present disclosure.

FIG. 2 depicts a block diagram illustrating an example of a device discovery manager 210 for facilitating fast device discovery for virtual machines. In some implementations, device discovery manager 210 may correspond to device discovery manager 140 of FIG. 1. As shown in FIG. 2, device discovery manager 210 may be a component of a computing apparatus 200 that includes a processing device 205, operatively coupled to a memory 201, to execute device discovery manager 210. In some implementations, processing device 205 and memory 201 may correspond to processing device 602 and main memory 604 respectively as described below with respect to FIG. 6.

Device discovery manager 210 may include device slot identifier 211, memory page generator 212, page table mapper 213, memory page provider module 214, and notification receiver 215. Alternatively, the functionality of one or more of device slot identifier 211, memory page generator 212, page table mapper 213, memory page provider module 214, and notification receiver 215 may be combined into a single module or divided into multiple sub-modules.

Device slot identifier 211 is responsible for identifying a memory address associated with a device slot of a communication bus. In various implementations, the communication bus can be a peripheral component interconnect (PCI) bus, a PCI express bus, or the like. As noted above, each slot of a communication bus can be used to connect to a hardware device (e.g., network interface card (NIC), graphical processing unit (GPU) card, a sound card, a wireless adapter card, or the like). Each slot of the communication bus may be associated with a particular memory address that can be used to address configuration space for the associated device for a particular device slot. In various implementations, when a device slot is unoccupied/unassigned (e.g., is not associated with any hardware device), the memory address for the device slot may not be mapped to a memory page in a memory page table.

Device slot identifier 211 can scan the device slots for a host communication bus to determine the memory addresses associated with each slot. Subsequently, device slot identifier 211 can determine whether the device slots of the communication bus are associated with a hardware device (e.g., an occupied device slot), or not (e.g., an unoccupied/unassigned device slot). Responsive to determining that a device slot of the communication bus is not associated with any hardware device (e.g., is unoccupied/unassigned), memory page generator 212 can be invoked to generate a read only memory page for the unoccupied/unassigned device slot.

Memory page generator 212 is responsible for generating a memory page (e.g., memory page 203) for a memory address of an unoccupied/unassigned device slot. In other words, if a device slot is not associated with a hardware device (and therefore does not have an allocated configuration space), memory page generator 212 can generate a memory page for the memory address of that device slot. In various implementations, memory page generator 212 can generate memory page 203 such that it contains a value that indicates that the memory address is not associated with any device. For example, the memory page 203 can be allocated to store a value of all binary '1's (e.g., a value that corresponds to hexadecimal 0xffffffff). Alternatively, the memory page 203 can be allocated to store another value that can be properly interpreted by a guest operating system of a virtual machine to indicate that the associated device slot is unoccupied/unassigned (e.g., is not associated with any hardware device).

Page table mapper 213 is responsible for mapping, in a page table (e.g., page table 202), a page table entry for the memory page (e.g., memory page 203) to the memory address of the unoccupied/unassigned device slot. In some implementations, the page table entry indicates that the memory page is read only for a guest OS of a VM. In an illustrative example, page table mapper 213 can create an page table entry in the extended page table (EPT) of the hypervisor that associates the generated memory page with a guest physical address associated with the device slot. Accordingly, when the guest OS probes the guest physical address of the device slot (which in some implementations can be interpreted as a read access of the memory address), the memory page 203 can be provided to the guest OS without causing a VM exit to the hypervisor.

Memory page provider module 214 is responsible for causing the memory page 203 to be provided to the guest OS of the VM responsive to detecting a read access of the memory address by the guest OS. As noted above, in some implementations, when the guest OS probes the unoccupied/unassigned device slot during VM start-up, the probe can be interpreted as a read operation. In such instances, the memory page 203 can be provided to the guest OS without causing a VM exit since there is a valid page table entry associated with the guest physical address of the device port. In some implementations, memory page provider module 214 can be invoked by processing device 205 to provide memory page 203. In other implementations, processing device 205 can provide memory page 203 to the guest OS directly.

Notification receiver 215 is responsible for receiving notifications from the guest OS that indicate a write access by the guest OS to the memory address. As noted above, the page table entry for memory page 203 can indicate that memory page 203 is read only. In such instances, any attempt by the guest OS to write to the memory page 203 can produce the notification to the hypervisor. In various implementations, the notification can be a VM exit that transfers control of processing device 205 from the guest OS to the hypervisor. Notification receiver 215 can then perform an operation to address the unauthorized attempt to write to memory page 203.

In one example, responsive to receiving the notification, notification receiver 215 can terminate execution of the VM immediately. In another example, responsive to receiving the notification, notification receiver 215 can send a response to the guest OS that indicates an error condition has occurred. In such instances, the guest OS can address the unauthorized access directly. In another example, responsive to receiving the notification, notification receiver 215 can send a notification to a management console that indicates an unauthorized access of memory page 203 by the guest OS. In another example, responsive to receiving the notification, notification receiver 215 can ignore the unauthorized access of memory page 203 by the guest OS. In this latter instance, notification receiver 215 can maintain a counter of the number of unauthorized accesses of memory page 203 by the guest OS. If the number of unauthorized accesses satisfies a threshold condition (e.g., if the number of unauthorized accesses exceeds a maximum threshold number), notification receiver 215 can then perform one of the above listed actions (e.g., terminate the VM, send a response to the guest OS, send a notification to a management console, or the like).

In some implementations, memory page 203 can be shared across multiple unoccupied/unassigned device slots for a single VM. In other words, the same memory page 203 can be mapped in mapping table 202 to the addresses of multiple unoccupied/unassigned device slots. In such instances, the amount of memory used for unoccupied/unassigned device slots can be significantly reduced. In an illustrative example, device slot identifier 211 can identify another memory address associated with another device slot of the communication bus, and determine whether that additional device slot is associated with any device. Responsive to determining that the additional device slot is not associated with any hardware device (e.g., the device slot is unoccupied/unassigned), page table mapper 213 can be invoked to map a page table entry for the additional memory address to memory page 203. As noted above, the additional page table entry can indicate that the memory page 203 is read only. In other words, the page table entry for the address of the second unoccupied/unassigned device slot can map to the same read only memory page 203 as other unoccupied/unassigned device slots for the guest OS. Subsequent attempts to access the memory page can be processed as described above.

In some implementations, memory page 203 can be shared across multiple VMs. In other words, the same memory page 203 can be mapped in mapping table 202 to the address of one or more unoccupied/unassigned device slots in more than one VM. In an illustrative example, page table mapper 213 can be invoked to map a page table entry for a memory address of an unoccupied/unassigned device slot to memory page 203 where, the additional page table entry can indicate that the memory page 203 is read only for an additional guest OS of another VM. In other words, the same memory page 203 can be mapped to device slot memory addresses for multiple VMs. Subsequent attempts to access the memory page by any of the VMs managed by the same hypervisor can be processed as described above.

Figure 3:
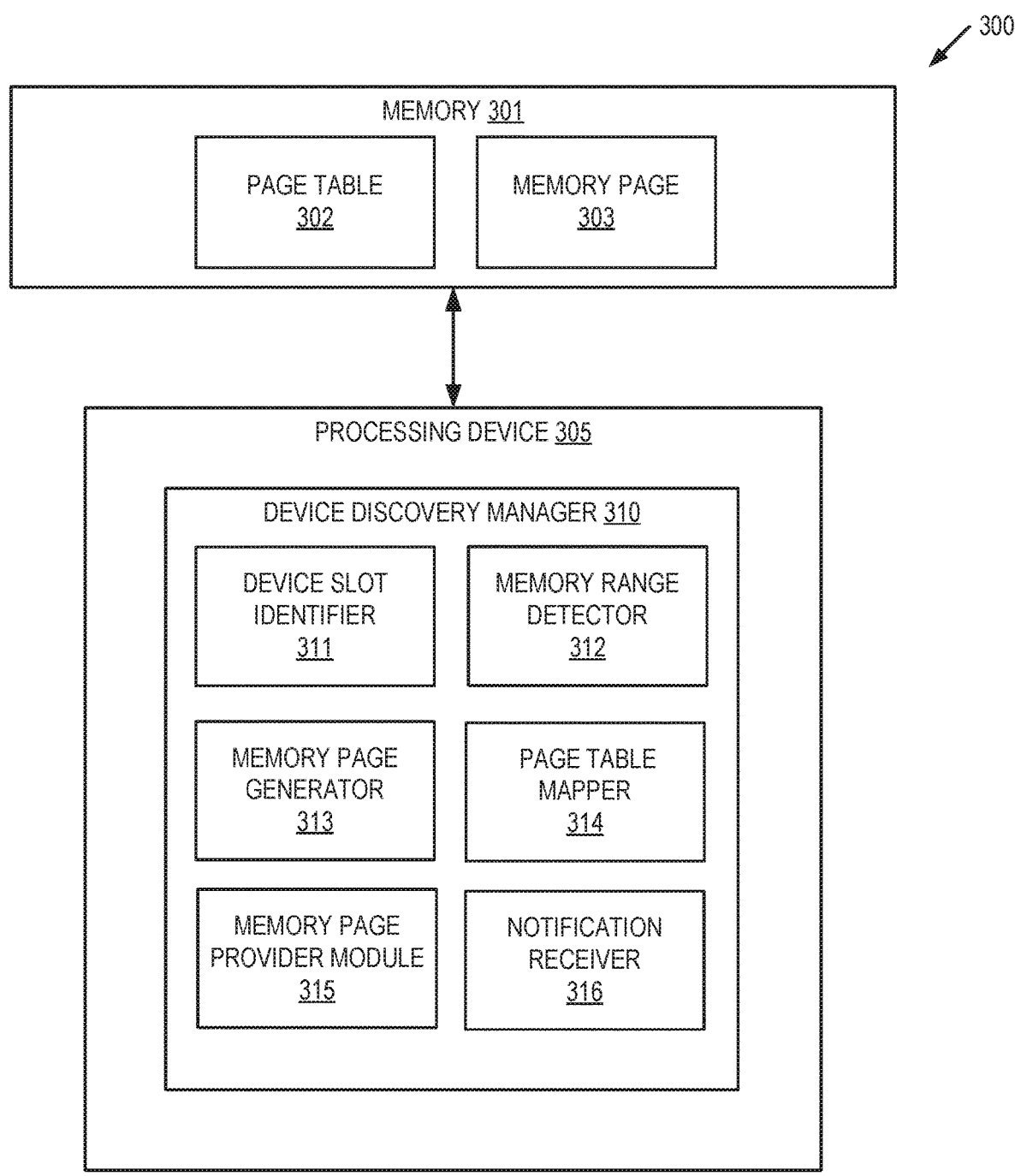
FIG. 3 depicts a block diagram illustrating another example of a device discovery manager to facilitate fast device discovery for virtual machines, in accordance with one or more aspects of the present disclosure.

FIG. 3 depicts a block diagram illustrating another example of a device discovery manager 310 for facilitating fast device discovery for virtual machines. In some implementations, device discovery manager 310 may correspond to device discovery manager 140 of FIG. 1. As shown in FIG. 3, device discovery manager 310 may be a component of a computing apparatus 300 that includes a processing device 305, operatively coupled to a memory 301, to execute device discovery manager 310. In some implementations, processing device 305 and memory 301 may correspond to processing device 602 and main memory 604 respectively as described below with respect to FIG. 6.

Device discovery manager 310 may include device slot identifier 311, memory range detector 312, memory page generator 313, page table mapper 314, memory page provider module 315, and notification receiver 316. Alternatively, the functionality of one or more of device slot identifier 311, memory range detector 312, memory page generator 313, page table mapper 314, memory page provider module 315, and notification receiver 316 may be combined into a single module or divided into multiple sub-modules.

Device slot identifier 311 is responsible for identifying memory addresses associated with a device slots of a communication bus. As noted above with respect to FIG. 2, in various implementations, the communication bus can be a PCI bus, a PCI express bus, or the like. Also as noted above, each slot of a communication bus can be used to connect to a hardware device (e.g., network interface card (NIC), graphical processing unit (GPU) card, a sound card, a wireless adapter card, or the like). Each slot of the communication bus may be associated with a particular memory address that can be used to address configuration space for the associated device for a particular device slot. In various implementations, when a device slot is unoccupied/unassigned (e.g., is not associated with any hardware device), the memory address for the device slot may not be mapped to a memory page in a memory page table.

Device slot identifier 311 can scan the device slots of a host communication bus to determine the memory addresses associated with each slot. Subsequently, device slot identifier 211 can determine whether the device slots of the communication bus are associated with a hardware device (e.g., an occupied device slot), or not (e.g., an unoccupied/unassigned device slot). In some implementations, once the device slots of a communication bus have been detected, and the addresses of any unoccupied/unassigned device slots have been identified, device slot identifier 311 can invoke memory range detector 312.

Memory range detector 312 is responsible for detecting whether any of the memory addresses for unoccupied/unassigned device slots are associated with a range of contiguous memory space of a guest OS of a VM. In some implementations, memory range detector 312 can analyze the guest physical memory of a guest OS and determine whether a contiguous range of the guest physical memory is associated with any of the unoccupied/unassigned device slots. If there are a series of consecutive unoccupied/unassigned device slots that are all within the contiguous range of guest physical memory, memory rage detector 312 can detect the memory range and determine whether a single large page of memory can be allocated to be associated with the range.

For example, in a large system where a memory page size of 4 kilobytes (kb), and where there are 500 consecutive unoccupied/unassigned device slots, a single large memory page of 2 Megabytes (Mb) can be allocated to cover the 500 device slots. In such instances, a single mapping table entry can be generated for all 500 device slots such that the single mapping table entry maps to the same large page. Responsive to detecting that a portion of the memory addresses identified by memory slot identifier 311 are associated with a range of contiguous memory space associated with a guest OS, memory page generator 313 can be invoked to generate a large memory page.

Memory page generator 313 is responsible for generating a large memory page (e.g., memory page 303) for the memory addresses associated with the contiguous memory space. In other words, memory page generator 312 can generate a large memory page for the entire range memory addresses of that device slot. In various implementations, memory page generator 312 can generate memory page 303 such that it contains a value that indicates that the memory addresses are not associated with any device. For example, the memory page 303 can be allocated to store a value of all binary '1's (e.g., a value that corresponds to hexadecimal 0xffffffff). Alternatively, the memory page 303 can be allocated to store another value that can be properly interpreted by a guest OS of a VM to indicate that the associated device slot is unoccupied/unassigned (e.g., is not associated with any hardware device).

Page table mapper 314 is responsible for mapping, in a page table (e.g., page table 302), a page table entry for the memory page (e.g., memory page 303) to the range of contiguous memory associated with the unoccupied/unassigned device slots. In some implementations, the page table entry indicates that the memory page 303 is read only for the guest OS. In an illustrative example, page table mapper 313 can create an page table entry in the extended page table (EPT) of the hypervisor that associates the generated memory page with a guest physical address associated with memory range. Accordingly, when the guest OS probes the guest physical address within the range (which in some implementations can be interpreted as a read access of the memory address), the contents of memory page 303 can be provided to the guest OS without causing a VM exit to the hypervisor.

Memory page provider module 315 is responsible for causing the memory page 303 to be provided to the guest OS of the VM responsive to detecting a read access of the memory address by the guest OS. As noted above, in some implementations, when the guest OS probes the unoccupied/ unassigned device slot during VM start-up, the probe can be interpreted as a read operation. In such instances, the memory page 303 can be provided to the guest OS without causing a VM exit since there is a valid page table entry associated with the guest physical address of the device port. In some implementations, memory page provider module 314 can be invoked by processing device 305 to provide memory page 303. In other implementations, processing device 305 can provide memory page 303 to the guest OS directly.

Notification receiver 316 is responsible for receiving notifications from the guest OS that indicate a write access by the guest OS to the memory address within the memory range. As noted above, the page table entry for memory page 303 can indicate that memory page 303 is read only. In such instances, any attempt by the guest OS to write to the memory page 303 can produce the notification to the hypervisor. In various implementations, the notification can be a VM exit that transfers control of processing device 305 from the guest OS to the hypervisor. Notification receiver 315 can then perform an operation to address the unauthorized attempt to write to memory page 303. In various implementations, notification receiver 315 can perform the operations described above with respect to notification receiver 215 of FIG. 2.

In various implementations, the large memory page can be shared across multiple ranges of unoccupied/unassigned device slots for a single VM. Similarly, the large memory page can be shared across multiple VMs. In such instances, the memory page can be allocated to other ranges of unoccupied/unassigned device slots for a single VM and/or multiple VMs in a similar fashion as described above with respect to FIG. 2.

Figure 4:
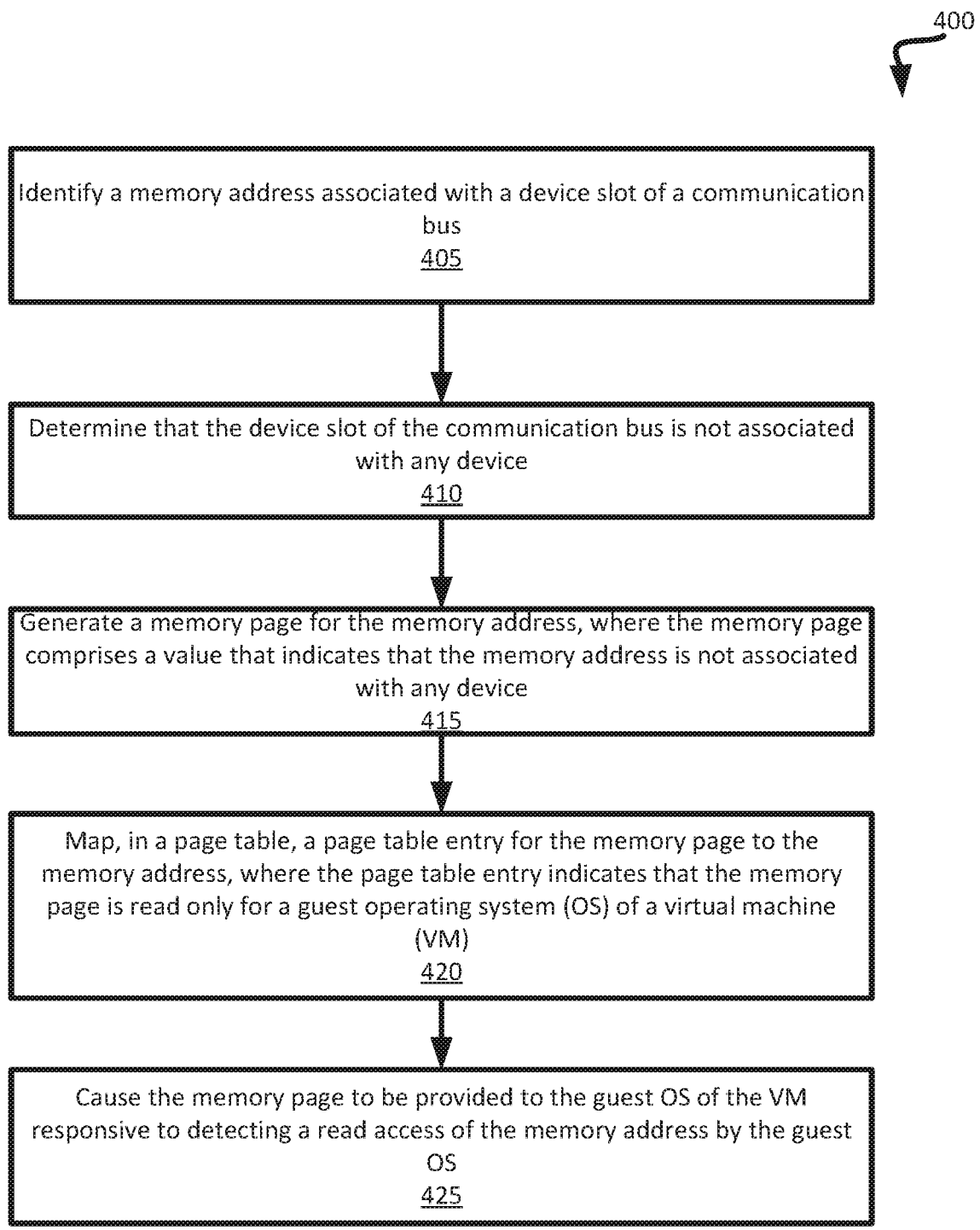
FIG. 4 depicts a flow diagram of a method for facilitating fast device discovery for virtual machines, in accordance with one or more aspects of the present disclosure.

FIG. 4 depicts a flow diagram of an example method 400 for facilitating fast device discovery for virtual machines. The method may be performed by processing logic that may comprise hardware (circuitry, dedicated logic, etc.), computer readable instructions (run on a general purpose computer system or a dedicated machine), or a combination of both. In an illustrative example, method 400 may be performed by device discovery manager 140 in FIG. 1, or device discovery manager 210 in FIG. 2. Alternatively, some or all of method 400 might be performed by another module or machine. It should be noted that blocks depicted in FIG. 4 could be performed simultaneously or in a different order than that depicted.

At block 405, processing logic identifies a memory address associated with a device slot of a communication bus. At block 410, processing logic determines that the device slot of the communication bus is not associated with any device. At block 415, processing logic generates a memory page for the memory address, where the memory page comprises a value that indicates that the memory address is not associated with any device. At block 420, processing logic maps, in a page table, a page table entry for the memory page to the memory address, where the page table entry indicates that the memory page is read only for a guest operating system (OS) of a virtual machine (VM). At block 425, processing logic causes the memory page to be provided to the guest OS of the VM responsive to detecting a read access of the memory address by the guest OS.

Figure 5:
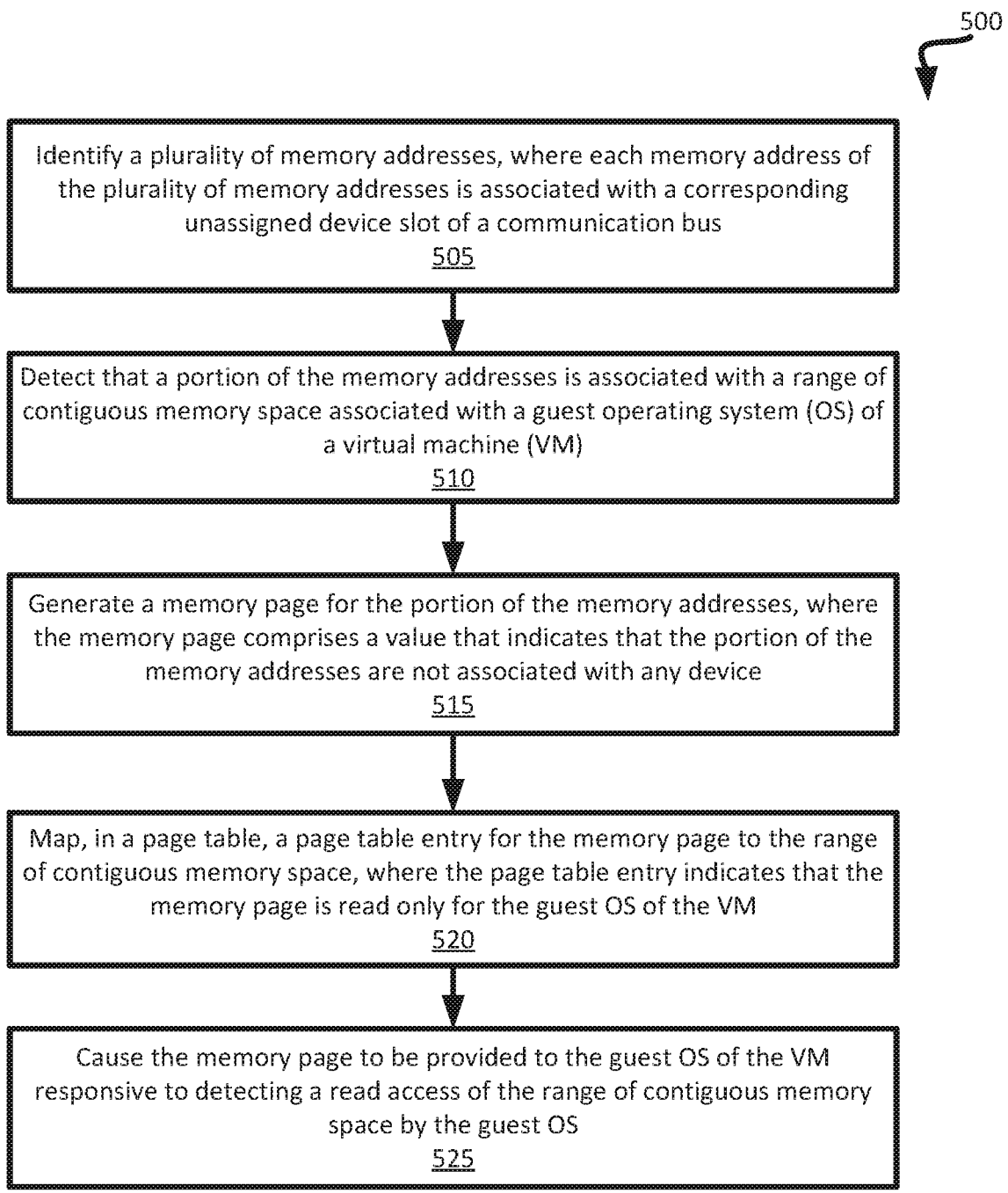
FIG. 5 depicts a flow diagram of another method for facilitating fast device discovery for virtual machines, in accordance with one or more aspects of the present disclosure.

FIG. 5 depicts a flow diagram of an example method 500 for facilitating fast device discovery for virtual machines. The method may be performed by processing logic that may comprise hardware (circuitry, dedicated logic, etc.), computer readable instructions (run on a general purpose computer system or a dedicated machine), or a combination of both. In an illustrative example, method 500 may be performed by device discovery manager 140 in FIG. 1, or device discovery manager 310 in FIG. 3. Alternatively, some or all of method 500 might be performed by another module or machine. It should be noted that blocks depicted in FIG. 5 could be performed simultaneously or in a different order than that depicted.

At block 505, processing logic identifies a plurality of memory addresses, where each memory address of the plurality of memory addresses is associated with a corresponding unassigned device slot of a communication bus. At block 510, processing logic detects that a portion of the memory addresses is associated with a range of contiguous memory space associated with a guest operating system (OS) of a virtual machine (VM). At block 515, processing logic generates a memory page for the portion of the memory addresses, where the memory page comprises a value that indicates that the portion of the memory addresses are not associated with any device. At block 520, processing logic maps, in a page table, a page table entry for the memory page to the range of contiguous memory space, where the page table entry indicates that the memory page is read only for the guest OS of the VM. At block 525, processing logic causes the memory page to be provided to the guest OS of the VM responsive to detecting a read access of the range of contiguous memory space by the guest OS.

Figure 6:
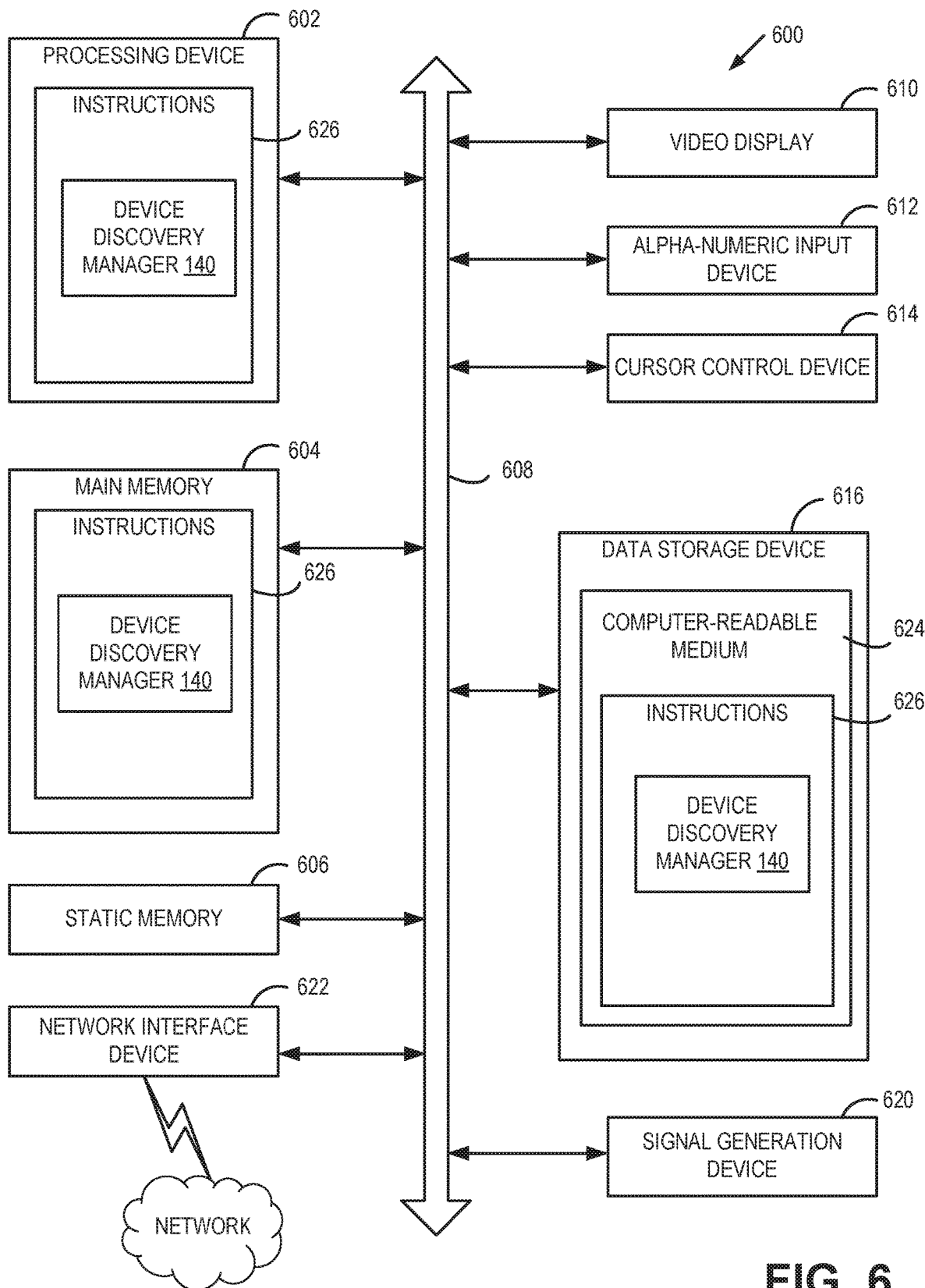
FIG. 6 depicts a block diagram of an illustrative computer system operating in accordance with one or more aspects of the present disclosure.

FIG. 6 depicts an example computer system 600 which can perform any one or more of the methods described herein. In one example, computer system 600 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic (e.g., instructions 626) that includes device discovery manager 140 for performing the operations and steps discussed herein (e.g., corresponding to the method of FIGS. 4-5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a non-transitory computer-readable medium 624 on which may store instructions 626 that include device discovery manager 140 (e.g., corresponding to the method of FIGS. 4-5, etc.) embodying any one or more of the methodologies or functions described herein. Device discovery manager 140 may also reside, completely or at least partially, within the main memory 604 and/or within the processing device 602 during execution thereof by the computer system 600, the main memory 604 and the processing device 602 also constituting computer-readable media. Device discovery manager 140 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "determining," "identifying," "mapping," "generating," "receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

Other computer system designs and configurations may also be suitable to implement the system and methods described herein. The following examples illustrate various implementations in accordance with one or more aspects of the present disclosure.

Example 1 is a method comprising identifying, by a processing device executing a hypervisor, a memory address associated with a device slot of a communication bus; determining that the device slot of the communication bus is not associated with any of one or more devices; generating a memory page for the memory address, wherein the memory page comprises a value that indicates that the memory address is not associated with any of the one or more devices; mapping, in a page table, a page table entry for the memory page to the memory address, wherein the page table entry indicates that the memory page is read only for a guest operating system (OS) of a virtual machine (VM); and causing, by the processing device, the memory page to be provided to the guest OS of the VM responsive to detecting a read access of the memory address by the guest OS.

Example 2 is the method of Example 1, further comprising receiving a notification from the guest OS, wherein the notification indicates a write access to the memory address by the guest OS.

Example 3 is the method of Example 2, further comprising responsive to receiving the notification from the guest OS, performing at least one of terminating execution of the VM, or sending a response to the guest OS that indicates an error condition.

Example 4 is the method of Example 2, further comprising responsive to receiving the notification from the guest OS, sending a second notification to a management console that indicates an unauthorized access of the memory address by the guest OS.

Example 5 is the method of Example 2, wherein read access of the memory address by the guest OS is detected without causing a VM exit.

Example 6 is the method of Example 1, further comprising identifying a second memory address associated with a second device slot of the communication bus; determining that the second device slot of the communication bus is not associated with any of the one or more devices; mapping, in the page table, a second page table entry for the memory page to the second memory address, wherein the second page table entry indicates that the memory page is read only; and causing the memory page to be provided to the guest OS of the VM responsive to detecting a second read access of the second memory address by the guest OS.

Example 7 is the method of Example 1, further comprising mapping, in the page table, a second page table entry for the memory page to the memory address, wherein the second page table entry indicates that the memory page is read only for a second guest OS of a second VM; and causing the memory page to be provided to the second guest OS of the second VM responsive to detecting a second read access of the memory address by the second guest OS.

Example 8 is a system comprising a memory, and a processing device, operatively coupled to the memory, to execute a hypervisor to: identify a memory address associated with a device slot of a communication bus; determine that the device slot of the communication bus is not associated with any device; generate a memory page for the memory address, wherein the memory page comprises a value that indicates that the memory address is not associated with any of one or more devices; map, in a page table, a page table entry for the memory page to the memory address, wherein the page table entry indicates that the memory page is read only for a guest operating system (OS) of a virtual machine (VM); and cause, by the processing device, the memory page to be provided to the guest OS of the VM in view of a read access of the memory address by the guest OS.

Example 9 is the system of Example 8, wherein the processing device is further to: receive a notification from the guest OS, wherein the notification indicates a write access to the memory address by the guest OS.

Example 10 is the system of Example 9, wherein the processing device is further to: responsive to receiving the notification from the guest OS, perform at least one of terminating execution of the VM, or sending a response to the guest OS that indicates an error condition.

Example 11 is the system of Example 9, wherein the processing device is further to: responsive to receiving the notification from the guest OS, send a second notification to a management console that indicates an unauthorized access of the memory address by the guest OS.

Example 12 is the system of Example 8, wherein read access of the memory address by the guest OS is detected without causing a VM exit.

Example 13 is the system of Example 8, wherein the processing device is further to: identify a second memory address associated with a second device slot of the communication bus; determine that the second device slot of the communication bus is not associated with any device; map, in the page table, a second page table entry for the memory page to the second memory address, wherein the second page table entry indicates that the memory page is read only; and cause the memory page to be provided to the guest OS of the VM in view of a second read access of the second memory address by the guest OS.

Example 14 is the system of Example 8, wherein the processing device is further to: map, in the page table, a second page table entry for the memory page to the memory address, wherein the second page table entry indicates that the memory page is read only for a second guest OS of a second VM; and cause the memory page to be provided to the second guest OS of the second VM in view of a second read access of the memory address by the second guest OS.

Example 15 is a non-transitory computer readable medium comprising instructions, which when accessed by a processing device, cause the processing device to execute a hypervisor to: identify a memory address associated with a device slot of a communication bus; determine that the device slot of the communication bus is not associated with any of one or more devices; generate a memory page for the memory address, wherein the memory page comprises a value that indicates that the memory address is not associated with any of the one or more devices; map, in a page table, a page table entry for the memory page to the memory address, wherein the page table entry indicates that the memory page is read only for a guest operating system (OS) of a virtual machine (VM); and cause, by the processing device, the memory page to be provided to the guest OS of the VM in view of a read access of the memory address by the guest OS.

Example 16 is the non-transitory computer readable medium of Example 15, wherein the processing device is further to: receive a notification from the guest OS, wherein the notification indicates a write access to the memory address by the guest OS.

Example 17 is the non-transitory computer readable medium of Example 16, wherein the processing device is further to: responsive to receiving the notification from the guest OS, terminate execution of the VM.

Example 18 is the non-transitory computer readable medium of Example 16, wherein the processing device is further to: responsive to receiving the notification from the guest OS, send a response to the guest OS that indicates an error condition.

Example 19 is the non-transitory computer readable medium of Example 15, wherein the processing device is further to: identify a second memory address associated with a second device slot of the communication bus; determine that the second device slot of the communication bus is not associated with any of the one or more devices; map, in the page table, a second page table entry for the memory page to the second memory address, wherein the second page table entry indicates that the memory page is read only; and cause the memory page to be provided to the guest OS of the VM in view of a second read access of the second memory address by the guest OS.

Example 20 is the non-transitory computer readable medium of Example 15, wherein the processing device is further to: map, in the page table, a second page table entry for the memory page to the memory address, wherein the second page table entry indicates that the memory page is read only for a second guest OS of a second VM; and cause the memory page to be provided to the second guest OS of the second VM in view of a second read access of the memory address by the second guest OS.

Example 21 is a method comprising: identifying a plurality of memory addresses, wherein each memory address of the plurality of memory addresses is associated with a corresponding unassigned device slot of a communication bus; detecting that a portion of the memory addresses is associated with a range of contiguous memory space associated with a guest operating system (OS) of a virtual machine (VM); generating a memory page for the portion of the memory addresses, wherein the memory page comprises a value that indicates that the portion of the memory addresses are not associated with any of one or more devices; mapping, in a page table, a page table entry for the memory page to the range of contiguous memory space, wherein the page table entry indicates that the memory page is read only for the guest OS of the VM; and causing, by the processing device, the memory page to be provided to the guest OS of the VM responsive to detecting a read access of the range of contiguous memory space by the guest OS.

Example 22 is the method of Example 21, further comprising: receiving a notification from the guest OS, wherein the notification indicates a write access to the range of contiguous memory space by the guest OS.

Example 23 is the method of Example 22, further comprising: responsive to receiving the notification from the guest OS, terminating execution of the VM.

Example 24 is the method of Example 22, further comprising: responsive to receiving the notification from the guest OS, sending a response to the guest OS that indicates an error condition.

Example 25 is the method of Example 22, further comprising: responsive to receiving the notification from the guest OS, sending a second notification to a management console that indicates an unauthorized access of the range of contiguous memory space by the guest OS.

Example 26 is the method of Example 21, further comprising: identifying a second portion of the memory addresses associated with a second range of contiguous memory space; mapping, in the page table, a second page table entry for the memory page to the second range of contiguous memory space, wherein the second page table entry indicates that the memory page is read only; and causing the memory page to be provided to the guest OS of the VM responsive to detecting a second read access of the second portion of the memory addresses by the guest OS.

Example 27 is the method of Example 21, further comprising: detecting that the portion of the memory addresses is associated with a second range of contiguous memory space associated with a second guest OS of a second VM; mapping, in the page table, a second page table entry for the memory page to the second range of contiguous memory space, wherein the second page table entry indicates that the memory page is read only for the second guest OS of the second VM; and causing the memory page to be provided to the second guest OS of the second VM responsive to detecting a second read access of the second range of contiguous memory space by the second guest OS.

Example 28 is a system comprising a memory, and a processing device, operatively coupled to the memory, to execute a hypervisor to: identify a plurality of memory addresses, wherein each memory address of the plurality of memory addresses is associated with a corresponding unassigned device slot of a communication bus; detect that a portion of the memory addresses is associated with a range of contiguous memory space associated with a guest operating system (OS) of a virtual machine (VM); generate a memory page for the portion of the memory addresses, wherein the memory page comprises a value that indicates that the portion of the memory addresses are not associated with any of one or more devices; map, in a page table, a page table entry for the memory page to the range of contiguous memory space, wherein the page table entry indicates that the memory page is read only for the guest OS of the VM; and cause the memory page to be provided to the guest OS of the VM responsive to detecting a read access of the range of contiguous memory space by the guest OS.

Example 29 is the system of Example 28, wherein the processing device is further to: receive a notification from the guest OS, wherein the notification indicates a write access to the range of contiguous memory space by the guest OS.

Example 30 is the system of Example 29, wherein the processing device is further to: responsive to receiving the notification from the guest OS, terminating execution of the VM.

Example 31 is the system of Example 29, wherein the processing device is further to: responsive to receiving the notification from the guest OS, sending a response to the guest OS that indicates an error condition.

Example 32 is the system of Example 29, wherein the processing device is further to: responsive to receiving the notification from the guest OS, sending a second notification to a management console that indicates an unauthorized access of the range of contiguous memory space by the guest OS.

Example 33 is the system of Example 28, wherein the processing device is further to: identifying a second portion of the memory addresses associated with a second range of contiguous memory space; mapping, in the page table, a second page table entry for the memory page to the second range of contiguous memory space, wherein the second page table entry indicates that the memory page is read only; and causing the memory page to be provided to the guest OS of the VM responsive to detecting a second read access of the second portion of the memory addresses by the guest OS.

Example 34 is the system of Example 28, wherein the processing device is further to: detecting that the portion of the memory addresses is associated with a second range of contiguous memory space associated with a second guest OS of a second VM; mapping, in the page table, a second page table entry for the memory page to the second range of contiguous memory space, wherein the second page table entry indicates that the memory page is read only for the second guest OS of the second VM; and causing the memory page to be provided to the second guest OS of the second VM responsive to detecting a second read access of the second range of contiguous memory space by the second guest OS.

Example 35 is a non-transitory computer readable medium comprising instructions, which when accessed by a processing device, cause the processing device to execute a hypervisor to: identify a plurality of memory addresses, wherein each memory address of the plurality of memory addresses is associated with a corresponding unassigned device slot of a communication bus; detect that a portion of the memory addresses is associated with a range of contiguous memory space associated with a guest operating system (OS) of a virtual machine (VM); generate a memory page for the portion of the memory addresses, wherein the memory page comprises a value that indicates that the portion of the memory addresses are not associated with any of one or more devices; map, in a page table, a page table entry for the memory page to the range of contiguous memory space, wherein the page table entry indicates that the memory page is read only for the guest OS of the VM; and cause the memory page to be provided to the guest OS of the VM responsive to detecting a read access of the range of contiguous memory space by the guest OS.

Example 36 is the non-transitory computer readable medium of Example 35, wherein the processing device is further to: receive a notification from the guest OS, wherein the notification indicates a write access to the range of contiguous memory space by the guest OS.

Example 37 is the non-transitory computer readable medium of Example 36, wherein the processing device is further to: responsive to receiving the notification from the guest OS, perform at least one of terminating execution of the VM, sending a response to the guest OS that indicates an error condition, and sending a second notification to a management console that indicates an unauthorized access of the range of contiguous memory space by the guest OS.

Example 38 is the non-transitory computer readable medium of Example 35, wherein the processing device is further to: identifying a second portion of the memory addresses associated with a second range of contiguous memory space; mapping, in the page table, a second page table entry for the memory page to the second range of contiguous memory space, wherein the second page table entry indicates that the memory page is read only; and causing the memory page to be provided to the guest OS of the VM responsive to detecting a second read access of the second portion of the memory addresses by the guest OS.

Example 39 is the non-transitory computer readable medium of Example 35, wherein the processing device is further to: detecting that the portion of the memory addresses is associated with a second range of contiguous memory space associated with a second guest OS of a second VM; mapping, in the page table, a second page table entry for the memory page to the second range of contiguous memory space, wherein the second page table entry indicates that the memory page is read only for the second guest OS of the second VM; and causing the memory page to be provided to the second guest OS of the second VM responsive to detecting a second read access of the second range of contiguous memory space by the second guest OS.

Example 40 is an apparatus comprising means for identifying, by a processing device executing a hypervisor, a memory address associated with a device slot of a communication bus; means for determining that the device slot of the communication bus is not associated with any of one or more devices; means for generating a memory page for the memory address, wherein the memory page comprises a value that indicates that the memory address is not associated with any of the one or more devices; means for mapping, in a page table, a page table entry for the memory page to the memory address, wherein the page table entry indicates that the memory page is read only for a guest operating system (OS) of a virtual machine (VM); and means for causing, by the processing device, the memory page to be provided to the guest OS of the VM responsive to detecting a read access of the memory address by the guest OS.

What is claimed is:

1. A method comprising:
   identifying, by a processing device executing a hypervisor, a memory address associated with a device slot of a communication bus;
   determining, by the processing device, that the device slot of the communication bus is not associated with a hardware device;
   responsive to determining that the device slot of the communication bus is not associated with a hardware device, generating, by the processing device, a memory page for the memory address, wherein the memory page comprises a value that indicates that the memory address is not associated with a hardware device;
   mapping, by the processing device in a page table, a page table entry for the memory page to the memory address, wherein the page table entry indicates that the memory page is read only for a guest operating system (OS) of a virtual machine (VM);
   detecting, by the processing device, a read access of the memory address by the guest OS; and
   causing, by the processing device, the memory page to be provided to the guest OS responsive to detecting the read access of the memory address by the guest OS.

2. The method of claim 1, further comprising:
   receiving, by the processing device, a notification from the guest OS, wherein the notification indicates a write access to the memory address by the guest OS.

3. The method of claim 2, further comprising:
   responsive to receiving the notification from the guest OS, performing, by the processing device, at least one of terminating execution of the VM, or sending a response to the guest OS that indicates an error condition.

4. The method of claim 2, further comprising:
responsive to receiving the notification from the guest OS, sending, by the processing device, a second notification to a management console that indicates an unauthorized access of the memory address by the guest OS.

5. The method of claim 1, wherein the read access of the memory address by the guest OS is detected without causing a VM exit.

6. The method of claim 1, further comprising:
identifying, by the processing device, a second memory address associated with a second device slot of the communication bus;
determining, by the processing device, that the second device slot of the communication bus is not associated with a hardware device;
responsive to determining that the second device slot of the communication bus is not associated with a hardware device, mapping, by the processing device in the page table, a second page table entry for the memory page to the second memory address, wherein the second page table entry indicates that the memory page is read only for the guest OS;
detecting, by the processing device, a second read access of the second memory address by the guest OS; and
causing, by the processing, the memory page to be provided to the guest OS responsive to detecting the second read access of the second memory address by the guest OS.

7. The method of claim 1, further comprising:
mapping, by the processing device in the page table, a second page table entry for the memory page to the memory address, wherein the second page table entry indicates that the memory page is read only for a second guest OS of a second VM;
detecting, by the processing device, a second read access of the memory address by the second guest OS; and
causing, by the processing device the memory page to be provided to the second guest OS responsive to detecting the second read access of the memory address by the second guest OS.

8. A system comprising:
a memory; and
a processing device, operatively coupled to the memory, to execute a hypervisor to:
identify a plurality of memory addresses, wherein each memory address of the plurality of memory addresses is associated with a corresponding unassigned device slot of a communication bus;
detect that a portion of the memory addresses is associated with a range of contiguous memory space associated with a guest operating system (OS) of a virtual machine (VM);
generate a memory page for the portion of the memory addresses, wherein the memory page comprises a value that indicates that the portion of the memory addresses is not associated with a hardware device;
map, in a page table, a page table entry for the memory page to the range of contiguous memory space, wherein the page table entry indicates that the memory page is read only for the guest OS; and
cause the memory page to be provided to the guest OS responsive to detecting a read access of the range of contiguous memory space by the guest OS.

9. The system of claim 8, wherein the processing device is further to:
receive a notification from the guest OS, wherein the notification indicates a write access to the range of contiguous memory space by the guest OS.

10. The system of claim 9, wherein the processing device is further to:
responsive to receiving the notification from the guest OS, perform at least one of terminating execution of the VM, or sending a response to the guest OS that indicates an error condition.

11. The system of claim 9, wherein the processing device is further to:
responsive to receiving the notification from the guest OS, send a second notification to a management console that indicates an unauthorized access of the range of contiguous memory space by the guest OS.

12. The system of claim 9, wherein the read access of the memory address by the guest OS is detected without causing a VM exit.

13. The system of claim 8, wherein the processing device is further to:
identify a second portion of the memory addresses associated with a second range of contiguous memory space;
map, in the page table, a second page table entry for the memory page to the second range of contiguous memory space, wherein the second page table entry indicates that the memory page is read only for the guest OS; and
cause the memory page to be provided to the guest OS responsive to detecting a second read access of the second portion of the memory addresses by the guest OS.

14. The system of claim 8, wherein the processing device is further to:
detect that the portion of the memory addresses is associated with a second range of contiguous memory space associated with a second guest OS of a second VM;
map, in the page table, a second page table entry for the memory page to the second range of contiguous memory space, wherein the second page table entry indicates that the memory page is read only for the second guest OS; and
cause the memory page to be provided to the second guest OS responsive to detecting a second read access of the second range of contiguous memory space by the second guest OS.

15. A non-transitory computer readable storage medium comprising instructions, which when accessed by a processing device, cause the processing device to execute a hypervisor to:
identify a memory address associated with a device slot of a communication bus;
determine that the device slot of the communication bus is not associated with a hardware device;
responsive to determining that the device slot of the communication bus is not associated with a hardware device, generate a memory page for the memory address, wherein the memory page comprises a value that indicates that the memory address is not associated with a hardware device;
map, in a page table, a page table entry for the memory page to the memory address, wherein the page table entry indicates that the memory page is read only for a guest operating system (OS) of a virtual machine (VM); and cause, by the processing device, the memory page to be provided to the guest OS in view of a read access of the memory address by the guest OS.

16. The non-transitory computer readable storage medium of claim 15, wherein the processing device is further to:
receive a notification from the guest OS, wherein the notification indicates a write access to the memory address by the guest OS.

17. The non-transitory computer readable storage medium of claim 16, wherein the processing device is further to:
responsive to receiving the notification from the guest OS, terminate execution of the VM.

18. The non-transitory computer readable storage medium of claim 16, wherein the processing device is further to:
responsive to receiving the notification from the guest OS, send a response to the guest OS that indicates an error condition.

19. The non-transitory computer readable storage medium of claim 15, wherein the processing device is further to:
identify a second memory address associated with a second device slot of the communication bus;
determine that the second device slot of the communication bus is not associated with a hardware device;
map, in the page table, a second page table entry for the memory page to the second memory address, wherein the second page table entry indicates that the memory page is read only for the guest OS; and
cause the memory page to be provided to the guest OS in view of a second read access of the second memory address by the guest OS.

20. The non-transitory computer readable storage medium of claim 15, wherein the processing device is further to:
map, in the page table, a second page table entry for the memory page to the memory address, wherein the second page table entry indicates that the memory page is read only for a second guest OS of a second VM; and
cause the memory page to be provided to the second guest OS in view of a second read access of the memory address by the second guest OS.

* * * * *